March 1, 1960 E. V. STATIA, SR 2,926,463
APPARATUS FOR MACHINING IRREGULARLY-CONTOURED WORKPIECES
Filed July 17, 1953 6 Sheets-Sheet 1
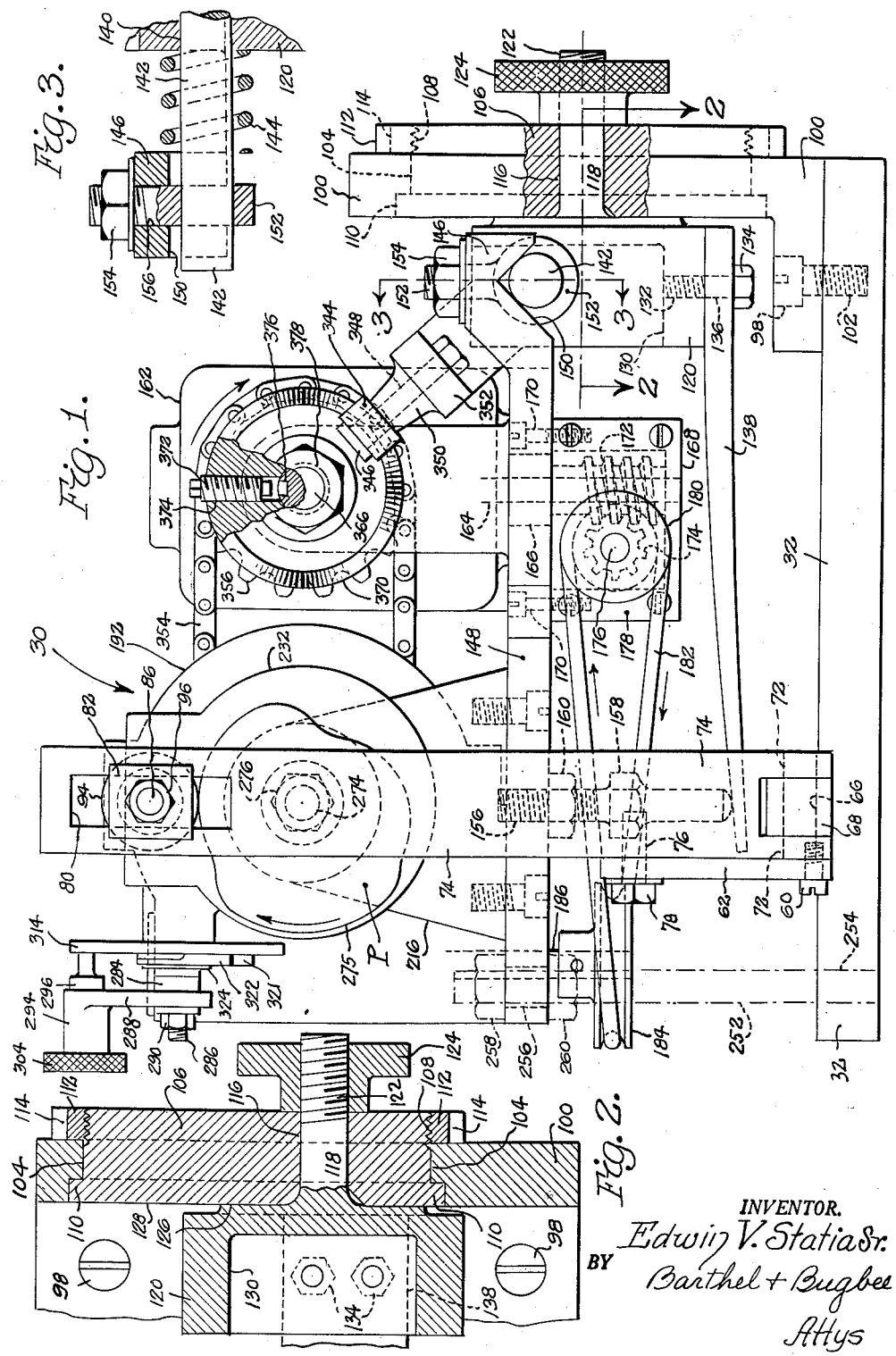
INVENTOR.
Edwin V. Statia Sr.
BY Barthel + Bugbee
Attys March 1, 1960 E. V. STATIA, SR 2,926,463
APPARATUS FOR MACHINING IRREGULARLY-CONTOURED WORKPIECES
Filed July 17, 1953 6 Sheets-Sheet 2
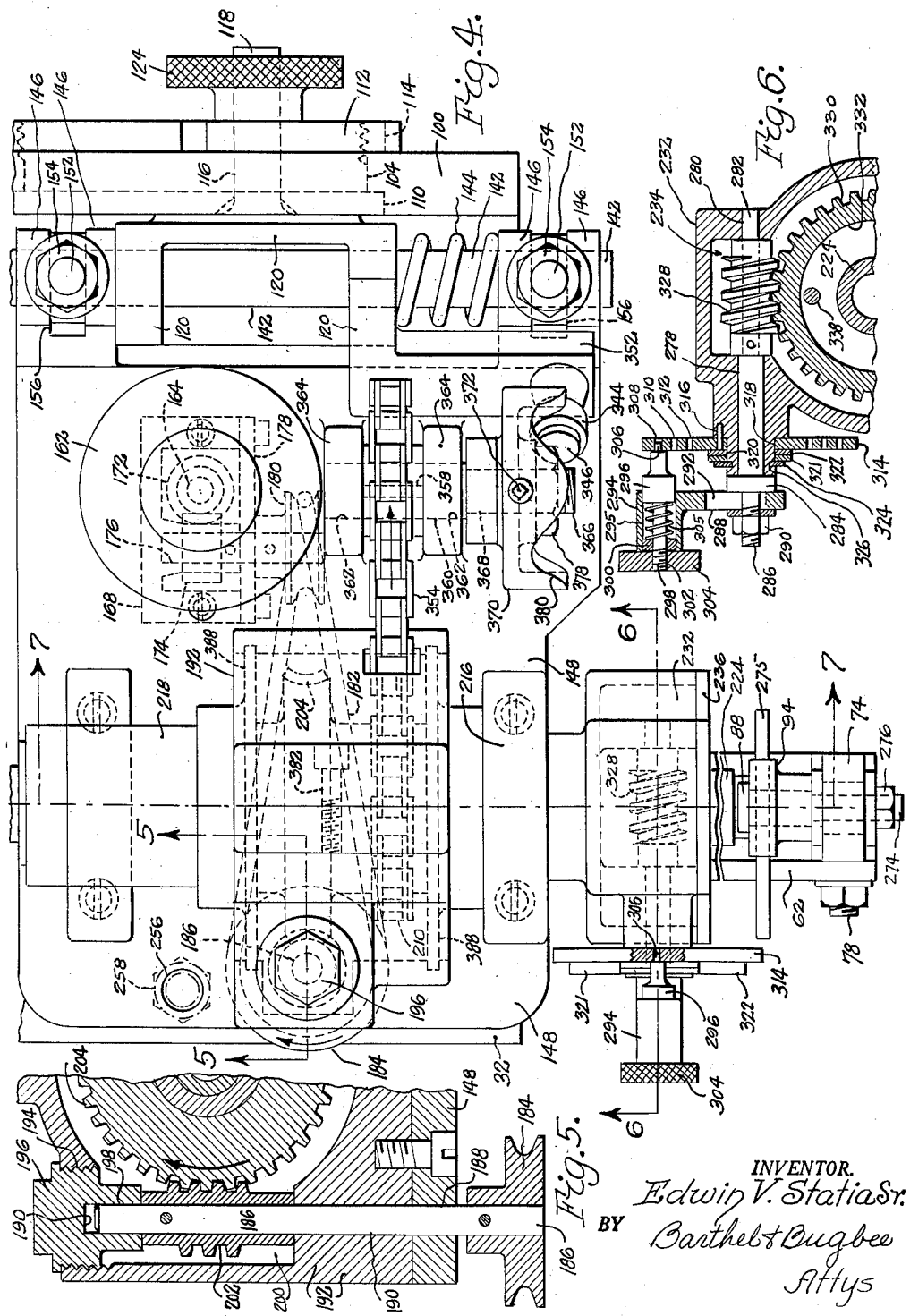
INVENTOR.
Edwin V. Statia Sr.
BY Barthel & Bugbee
Attys

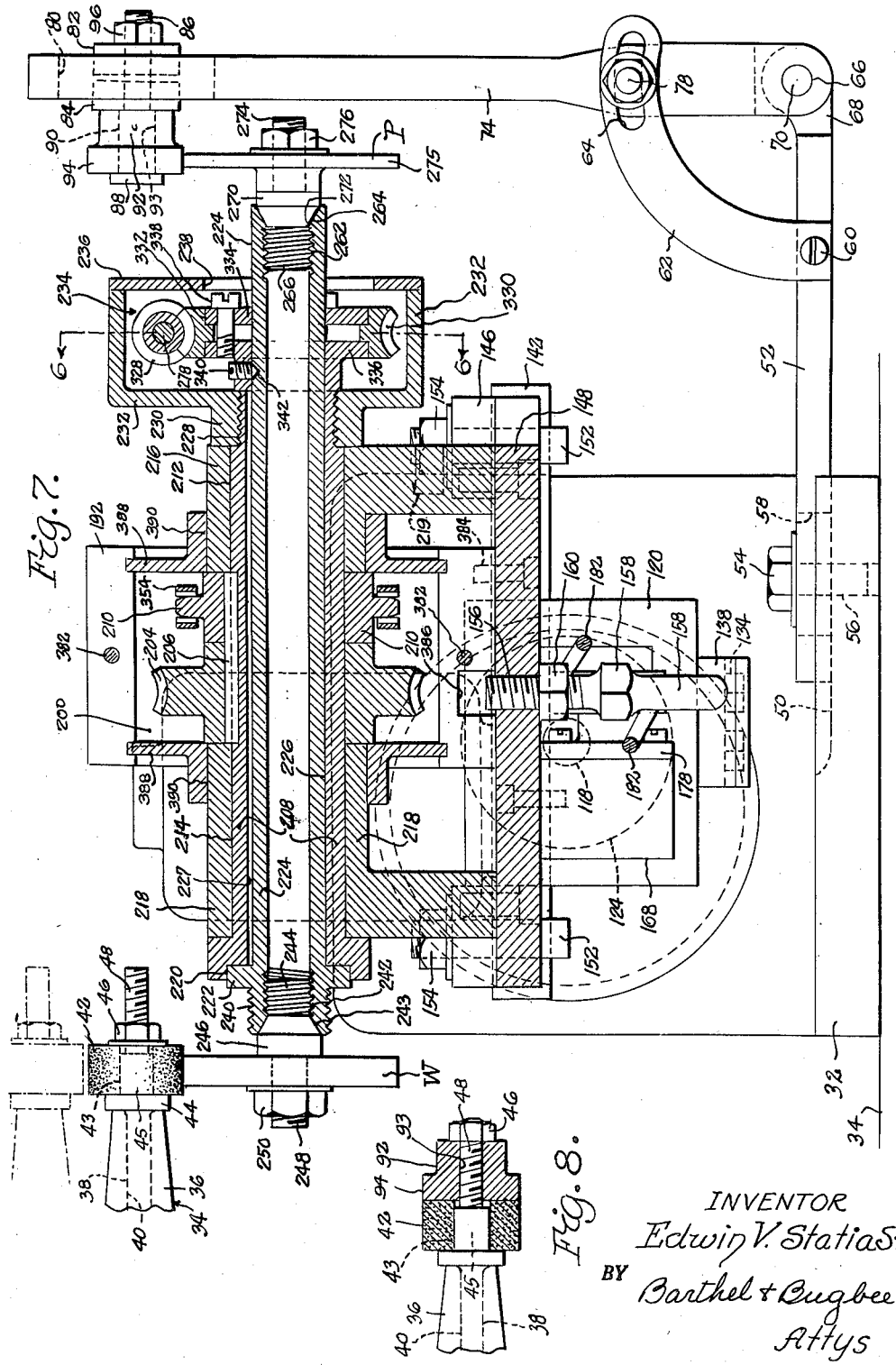

March 1, 1960
E. V. STATIA, SR
2,926,463
APPARATUS FOR MACHINING IRREGULARLY-CONTOURED WORKPIECES
Filed July 17, 1953
6 Sheets-Sheet 4
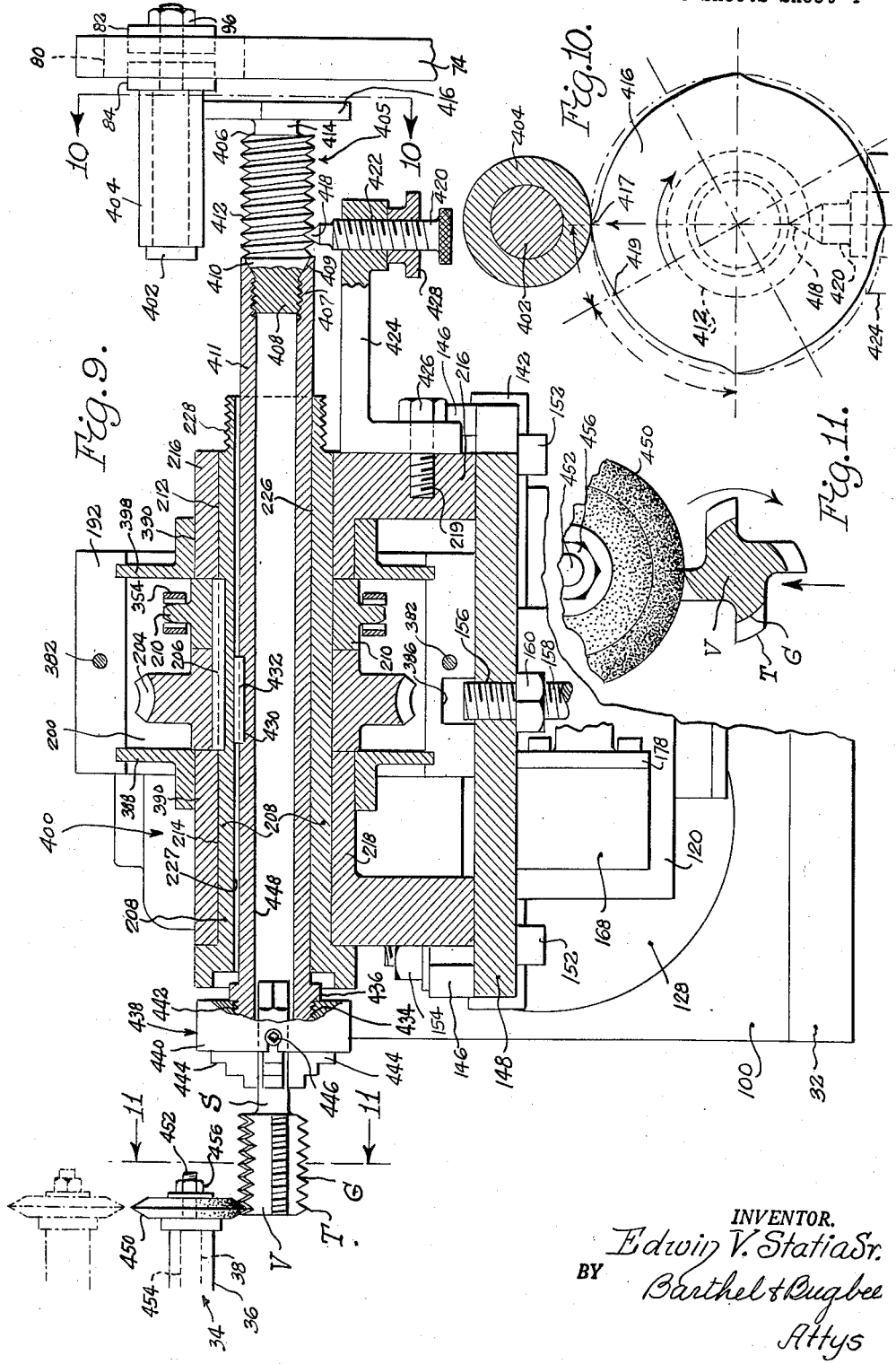

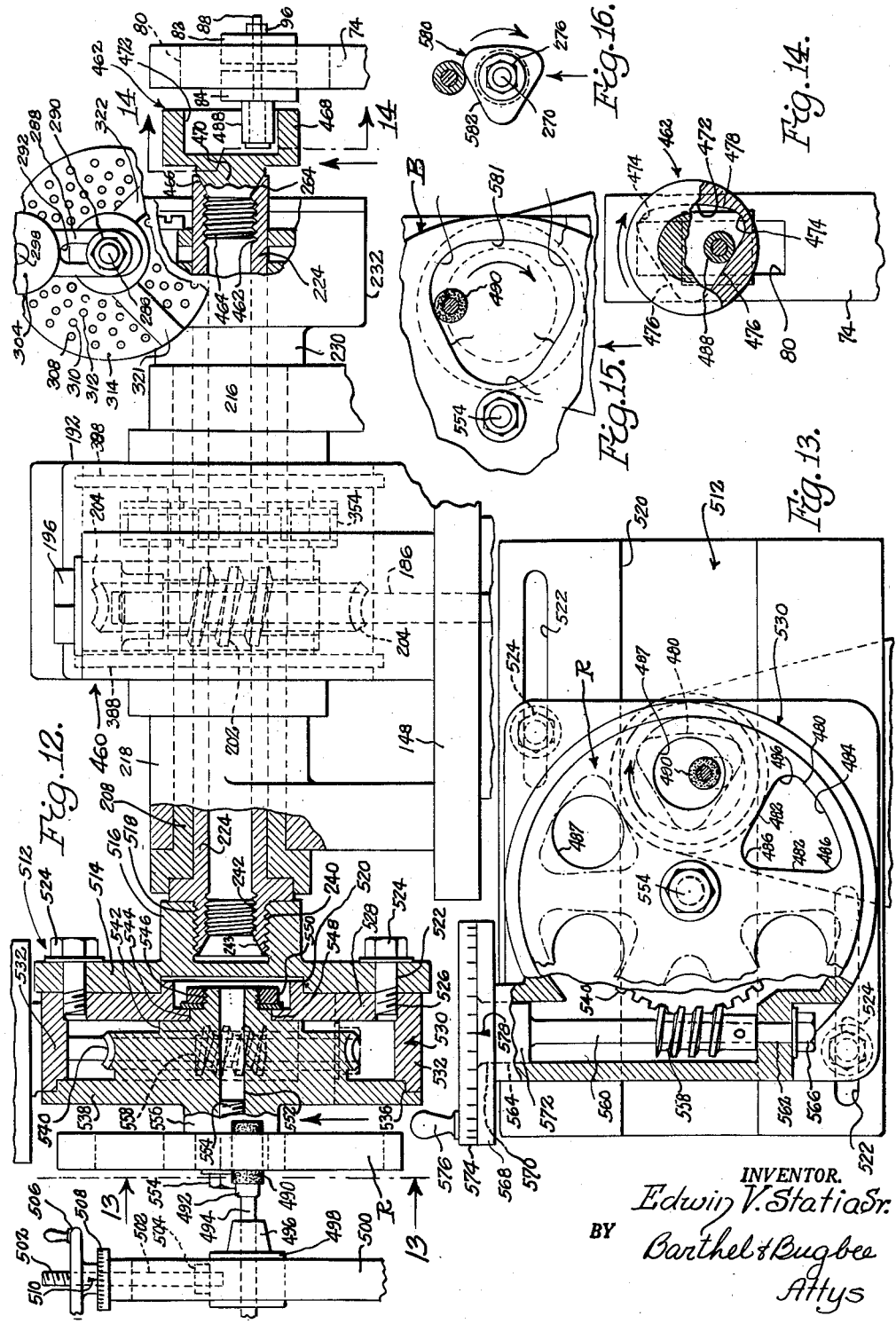

March 1, 1960     E. V. STATIA, SR     2,926,463
APPARATUS FOR MACHINING IRREGULARLY-CONTOURED WORKPIECES
Filed July 17, 1953     6 Sheets-Sheet 6
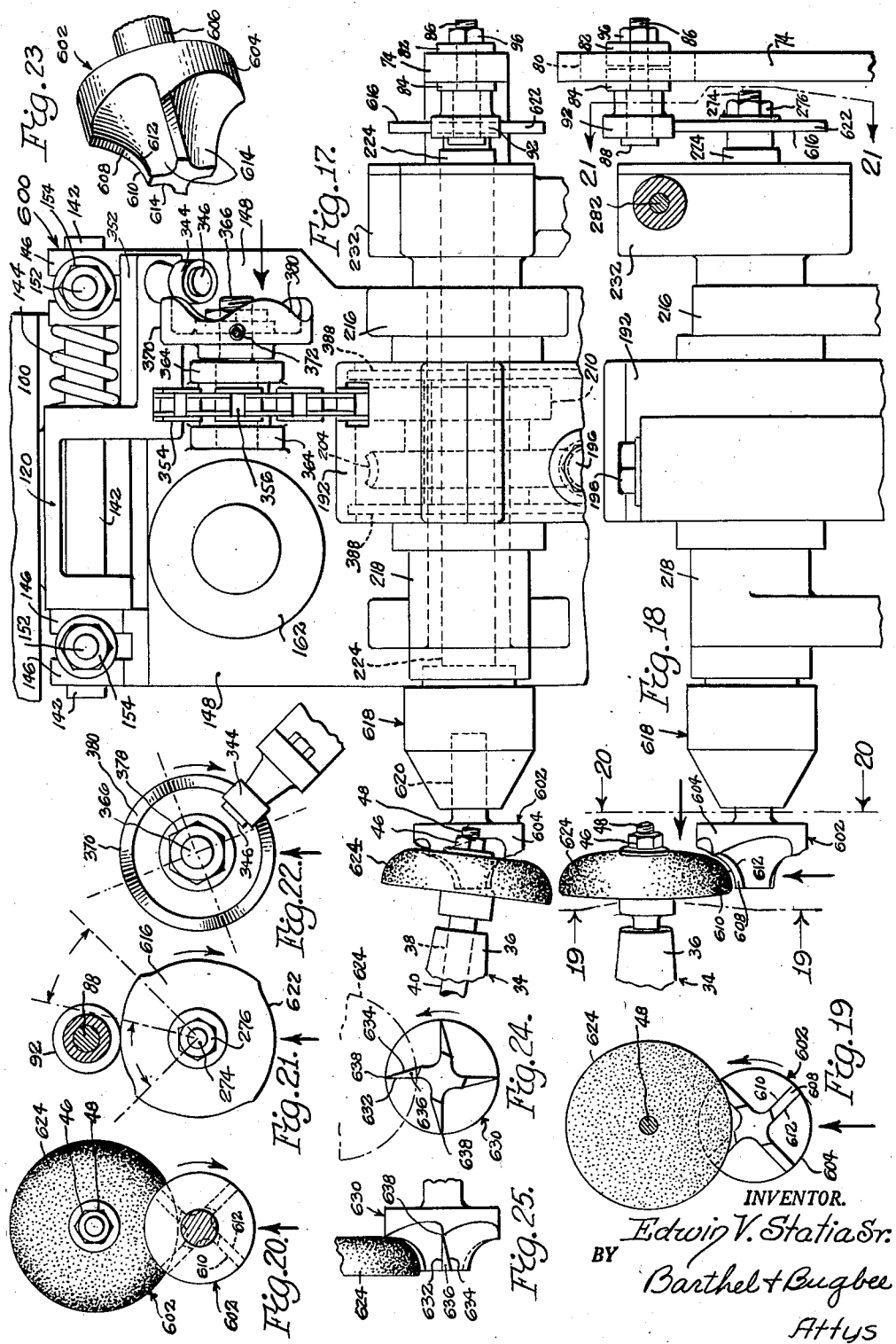
INVENTOR.
Edwin V. Statia Sr.
BY Barthel & Bugbee
Attys 2,926,463
Patented Mar. 1, 1960

United States Patent Office

2,926,463

APPARATUS FOR MACHINING IRREGULARLY-CONTOURED WORKPIECES

Edwin V. Statia, Sr., Detroit, Mich., assignor of one-half to Edward L. Chapman, Detroit, Mich.

Application July 17, 1953, Serial No. 368,790

3 Claims. (Cl. 51—101)

This invention relates to machine tools and, in particular, to apparatus for machining irregularly-contoured workpieces, such as cams, dies, taps, reamers, end mills and the like.

One object of this invention is to provide an apparatus for machining irregularly-contoured workpieces wherein the work is held and moved in a path determined by one or more patterns or cams while it is acted upon by the machining tool, such as an abrasive wheel or other machining tool.

Another object is to provide an apparatus for machining irregularly-contoured workpieces wherein the workpiece is mounted upon a rotary shaft which also carries a rotary cam or pattern, the shaft being itself rotatably mounted upon a carriage which is moved to and fro around a pivot shaft in response to the rotation of the cam or pattern, thereby moving the workpiece toward and away from the grinding wheel or other machining tool, according to the motions determined by the cam or pattern.

Another object is to provide an apparatus for machining irregularly-contoured workpieces according to the foregoing objects wherein indexing mechanism is also provided for adapting the apparatus to the machining of workpieces which have multiple surfaces or portions of the same irregular configuration but disposed in a symmetrical arrangement.

Another object is to provide an apparatus for machining irregularly-contoured workpieces of the foregoing character, wherein additional mechanism is provided for moving the carriage and consequently the workpiece shaft in a direction axially of the workpiece shaft so as to provide a backing-off action on the workpiece, whereby the cutting lips on fluted cutting tools may be accurately and easily machined.

Another object is to provide an apparatus for machining irregularly-contoured workpieces which is also quickly and easily adapted to the grinding or other machining of workpieces having helically-disposed surfaces such as taps for threading bores, a workpiece pattern of helical configuration being then employed in place of a workpiece configuration cam.

Another object is to provide an apparatus for machining irregularly-contoured workpieces which is also quickly and easily adapted for the grinding or other machining of workpieces having internal surfaces of irregular contour to be machined, either by the use of an internal or external pattern.

Other objects and advantages of the invention will become apparent during the description of the accompanying drawings, wherein:

Figure 1 is a rear elevation of an apparatus for machining irregularly-contoured workpieces, according to one form of the invention, with certain portions in section to disclose the internal construction;

Figure 2 is a fragmentary horizontal section taken along the line 2—2 in Figure 1, showing the carriage-swinging mechanism;

Figure 3 is a fragmentary vertical section taken along the line 3—3 in Figure 1, showing the carriage pivotal mounting;

Figure 4 is a top plan view of the apparatus shown in Figure 1;

Figure 5 is a fragmentary vertical section taken along the line 5—5 in Figure 4, showing the workpiece shaft driving mechanism;

Figure 6 is a vertical section taken along the line 6—6 in Figures 4 and 7, showing the workpiece indexing mechanism for workpieces with repetitive irregularly-contoured portions.

Figure 7 is a vertical section taken along the line 7—7 in Figure 4, showing the workpiece shaft with its pattern and carriage in relation to the grinding wheel and pattern follower;

Figure 8 is a fragmentary view partly in section showing the manner in which the grinding wheel and workpiece pattern follower are mounted while being trued to the same diameters before being used;

Figure 9 is a vertical sectional view through the workpiece shaft axis, similar to Figure 7 but showing the apparatus set up for simultaneously grinding and backing off helically-disposed surfaces, such as the thread cutting teeth on a threading tap;

Figure 10 is a vertical section taken along the line 10—10 in Figure 9, at the pattern end of the apparatus, showing the backing-off cam;

Figure 11 is a vertical section taken along the line 11—11 in Figure 9, at the workpiece end of the apparatus, showing the backing-off of the workpiece cutting teeth accomplished during the grinding operation.

Figure 12 is a side elevation, partly in vertical section, of the apparatus of Figure 1, set up for the machining of multiple internal surfaces of irregular contour;

Figure 13 is a vertical section taken along the line 13—13 in Figure 12, showing the workpiece during the machining operation;

Figure 14 is a vertical section taken along the line 14—14 in Figure 12, showing the internal workpiece cam or pattern;

Figure 15 is a fragmentary end elevation of a portion of a workpiece, mounted as in Figure 13, but employing the external cam of Figure 16 for its production;

Figure 16 is a fragmentary diagrammatic end elevation of the external cam or pattern and follower used for machining the portion of the workpiece shown in Figure 15;

Figure 17 is a top plan view of the apparatus of Figure 1, as set up for the machining of a workpiece, such as an end mill, wherein the workpiece is moved axially while being rotated and backed off, to produce properly configured and angled cutting teeth on the workpiece;

Figure 18 is a fragmentary side elevation of the apparatus, partly in section, set up as in Figure 17, with the indexing device of Figure 12 partly omitted to disclose the underlying structure;

Figure 19 is a vertical section taken along the line 19—19 in Figure 18, looking toward the front of the workpiece;

Figure 20 is a vertical section taken along the line 20—20 in Figure 18, looking toward the back of the workpiece;

Figure 21 is a vertical section taken along the line 21—21 in Figure 18, looking toward the pattern and follower;

Figure 22 is a fragmentary diagrammatic rear elevation of a carriage reciprocating cam and follower employed in machining the workpiece of Figures 17 to 21 inclusive;

Figure 23 is a front perspective view of a completely machined workpiece produced by the set-up of Figures 17 to 22 inclusive;

Figure 24 is a diagrammatic view, similar to Figure 20, but showing the erroneously configured portions of a defective workpiece produced if the carriage-reciprocating mechanism of Figure 2 is not employed; and Figure 25 is a fragmentary side elevation of the defective workpiece shown in Figure 24.

*Summarized description*

In general, the apparatus of the present invention (Figures 1 to 8 inclusive) consists of a base upon which a carriage is tiltably mounted around a pivot shaft, the base being clamped to the bed of a grinding machine or other machine tool having a rotary grinder or cutter for machining the workpiece. The carriage with its pivot shaft is capable of being raised or lowered relatively to the base by eccentric mechanism and clamped in its adjusted position in order to position the workpiece relatively to the grinding wheel or other machining tool. The workpiece is mounted on a rotary shaft journaled in bearing brackets on the carriage and rotated by a motor through speed reduction mechanism. The workpiece shaft at the opposite end from the workpiece carries a workpiece cam or pattern which engages a cam or pattern follower of the same diameter as the grinding wheel or other rotary cutter, and supported by a stationary bracket so that the rotation of the pattern against the stationary follower moves the workpiece shaft and carriage up and down relatively to the grinding wheel or cutter around the carriage pivot shaft. This action produces a backing off of the surfaces being machined on the workpiece while machining is proceeding. An indexing mechanism is also provided (Figures 1, 4, 6 and 12) for indexing the workpiece to different stations manually, if so desired, while the workpiece shaft is not rotated by power.

The workpiece shaft regularly employed (Figure 7) is capable of being replaced by an interchangeable axially-reciprocable workpiece shaft (Figure 9) for grinding or otherwise machining workpieces with helical surfaces, such as threaded taps, the axial motion of this shaft being provided by the configuration of a helical cam or pattern for that purpose. An optionally employed crown cam is provided (Figures 1, 4, 17 and 22) for reciprocating the carriage and workpiece shaft axially thereof, for machining workpieces which require such motion in order to produce an accurate configuration of the workpiece. A face plate (Figures 12 and 13) is also provided which can be attached to and mounted on the workpiece shaft for holding a workpiece and auxiliary indexing mechanism where the workpiece has multiple portions of similar irregular configuration which are symmetrically distributed around an axis of rotation.

*External grinding set-up of the apparatus without axial motion*

Referring to the drawings in detail, Figures 1 to 7 inclusive show an apparatus, generally designated 30, for machining irregularly-contoured workpieces such as cams, fluted cutting tools, including taps, dies, reamers, end mills and the like, or workpieces with helical surfaces such as taps or threads. The apparatus 30 is shown in Figures 1 to 7 inclusive as set up for the external grinding of such workpieces without shifting the grinding plane. The apparatus 30 is mounted upon a base 32 in the form of a rectangular plate which can be clamped to the bed of a machine tool, generally designated 34 (Figure 7), such as a grinder, which has a portion or head 36 with a bore 38 in which is journaled a rotary power-driven shaft 40 having a rotary machining tool 42, such as a grinding wheel bored as at 43 for mounting thereon and held on the stepped portion 45 against the enlargement or flange 44 thereof by a nut 46 threaded onto the reduced diameter threaded portion 48 of the shaft 40. The machine tool 34 is conventional and many types thereof are equally applicable to the use of the invention. A conventional grinder is preferred, in which the head 34 is capable of being raised and lowered, as indicated by the dotted lines in Figures 7 and 9, for conveniently locating the grinding wheel 42 relatively to the workpiece.

The base 32 is grooved or otherwise recessed as at 50 (Figure 7) to receive a bracket 52 bolted thereto by a bolt 54 threaded into the hole 56 in the base 32, passing through an elongated slot 58 in the bracket 52 to permit adjustment thereof along the groove 50 relatively to the base 32.

Secured as at 60 to the bracket 52 is an arcuate member 62 (Figures 1 and 7) having an arcuate slot 64, the center of curvature of which is located at the axis of a bore 66 in a boss 68 on the end of the bracket 52. Mounted in the bore 66 is a pivot pin 70 carried by aligned bores 72 in the bifurcated lower end of a swingable arm 74. Threaded into the transverse threaded hole 76 in one side of the arm 74 is a clamping bolt 78 which passes through the arcuate slot 64 and serves to releasably clamp the arm 74 to the arcuate member 62 and thereby hold the former in its adjusted position.

The upper end of the arm 74 is provided with an elongated rectangular vertical slot 80 (Figures 1 and 7) in which a pair of flanged blocks 82 and 84 are slidably mounted, from opposite sides of the arm 74. The blocks 82 and 84 are bored for the passage of the reduced diameter threaded portion 86 of a headed axle bolt 88, the smooth shank 90 of which serves as the axle for a pattern or cam follower roller 92 bored as at 93 to receive it, and having a cylindrical contact portion 94 which, as described in connection with Figure 8, in maintained to substantially the same diameter as the grinding wheel or other cutting tool 42, in order to maintain the accuracy of machining. The annular shoulder between the reduced diameter portion 86 and the smooth shank 90 of the axle bolt 88 abuts the outer surface of the block 84 so that when the nut 96 on the threaded portion 86 is tightened, it clamps the two blocks 82 and 84 tightly against the opposite sides of the arm 74 and thus positions the axle bolt 88 and follower roller 92 at a predetermined distance from the axis of the pivot pin 70.

The cam or pattern follower 92 is trued simultaneously to the same diameter as the grinding wheel 42 at the times the latter is retrued (Figure 8), by removing the nut 46 and its washer from the reduced diameter threaded portion 48 of the shaft 40, sliding the roller 92 upon the latter, and replacing the nut 46. Consequently, when the truing tool is run across the periphery of the grinding wheel 42, it is continued across the periphery of the roller 94, thereby turning both to the same diameter.

Bolted as at 98 (Figure 1) to the base 32 is an upstanding angle bracket 100, the bolts 98 being threaded into threaded holes 102 in the base 32 (Figures 1 and 2). The vertical portion of the angle bracket 100 is provided with a large countersunk bore 104 in which is mounted a correspondingly configured flanged disc or pivot member 106 of substantially cylindrical shape having a threaded portion 108 at the opposite end from its flange or head 100. Threaded onto the threaded portion 108 is a correspondingly-threaded clamping ring 112 having peripheral notches or recesses 114 for receiving a conventional spanner or wrench (not shown). In this manner, the pivot member 106 serves as a pivot shaft which is extremely short in proportion to its diameter. The member 106 can also be accurately designated an eccentric disc or shaft because it is provided with a bore 116 disposed eccentrically of the center and periphery of the pivot member 106. Rotatably supported in the bore 116 is a rod-like shank 118 projecting from and integral with a rotatable support 120 of rectangular outline. The shank 118 is threaded as at 122 at its outer end and provided with a knurled hand wheel 124 threaded thereon for clamping purposes. The inner end of the shank 118 and the adjacent portion of the bore 116 are flared.

The rotatable support 120 is in the form of a rectangular block having an abutment portion or face 126 which engages the adjacent face 128 of the pivot member 106 (Figure 2). The upper portion of the block 120 is provided with a hollow 130 extending downwardly therein from the top thereof. The lower portion of the rotary support 120 is provided with a plurality of vertical threaded holes 132 which receive bolts or cap screws 134 passing through holes 136 in the rearward end of a powerful leaf spring 138 (Figure 1) which projects forwardly in a cantilever manner.

The upper portion of the rotary support 120 is provided with aligned bores 140 (Figure 3) in the opposite side walls thereof on opposite sides of the hollow 130. Rotatably and slidably mounted in the bores 140 is a pivot shaft 142 around which is coiled a helical compression spring 144, one end of which is seated against the rotary support 120 and the other end against the inner surface of one of a pair of bifurcated bosses or arms 146 integral with and projecting rearwardly from a tiltable carriage 148 (Figures 1 and 4). The arms 146 are offset upwardly (Figure 1) and on their lower sides are provided with aligned V-notches 150, the inclined sides of which rest upon the pivot shaft 142. The arms 146 are clamped to the shaft 142 by eye bolts 152 encircling the shaft 142, which they are bored to receive, and carrying clamping nuts 154 threaded upon their shanks on the upper sides of the arms 146, which are provided with vertical slots 156 for the reception of the eye bolts 152.

The carriage 148 near the outer or forward end thereof remote from the pivot shaft is provided with a threaded vertical hole 156 (Figure 7) into which is threaded the upper end of a threaded stud or push rod 158 held in place by the lock nut 160 and having a rounded lower end engaged by the outer end of the cantilever leaf spring 138. In this manner, the carriage 148 is urged upwardly by the leaf spring 138.

Mounted on and bolted or otherwise secured to the upper side of the carriage 148 is a vertical motor 162 of a conventional type, the vertical armature shaft 164 of which extends downwardly through a hole 166 in the carriage 148 (Figure 1) and has its lower end journaled in a sub-housing 168 bolted as at 170 to the underside of the platform 148. Drivingly secured to the armature shaft 164 of the motor 162 is a worm 172 meshing with a worm gear 174, the shaft 176 of which is journaled in and extends through a cover plate 178 bolted to the side of the sub housing 168 and carrying on its outer end a pulley 180. The pulley 180 is drivingly connected by a quaterturn belt 182 to a pulley 184 which is pinned or otherwise drivingly secured to a vertical shaft 186 (Figures 1 and 5) which passes through aligned bores 188 and 190 in the carriage 148 and a gear box housing 192 bolted thereto. The gear box housing 192 has a threaded opening 194 in the upper side thereof receiving a threaded bearing plug 196 having a bearing bore 198 in which the upper end of the shaft 186 is journaled, the lower end being journaled in the bore 190. Pinned or otherwise drivingly secured to the shaft 186 within a chamber 200 inside the housing 192 is a worm 202 which meshes with and drives a worm gear 204 (Figure 5).

The worm gear 204 is mounted on and keyed at 206 (Figure 7) to a tubular outer shaft 208 and also to a sprocket 210 mounted thereon, the tubular shaft 208 being journaled in aligned bores 212 and 214 in bearing brackets 216 and 218 which are bolted to the carriage 148. The bearing bracket 216 is provided with a horizontal threaded hole 219 which is, however, not used in this setup. The enlarged outer end of the shaft 208 is counterbored as at 220 to receive the annular flange 222 of an inner tubular shaft 224 which passes through the bore 226 in the outer tubular shaft 208 from end to end thereof and projects therefrom at its opposite ends. The bore 226 is provided with a keyway 227 extending from end to end thereof but not used in this set-up. The opposite end of the outer tubular shaft 208 is threaded as at 228 to receive the correspondingly internally threaded neck 230 of an indexing housing 232 containing an indexing device, generally designated 234. The housing 232 is cup-shaped and closed by a disc-shaped closure plate 236 having an opening 238 therein for the passage of the inner tubular shaft 224.

The forward end of the inner tubular shaft 224 adjacent the flange 222 is threaded both externally and internally at 240 and 242 respectively (Figure 7). The threaded bore 242 at its outer end is flared as at 243 and receives the threaded inner end 244 of a work-holding stud 246 having a partially threaded reduced diameter portion 248 upon which the workpiece W to be machined is mounted and held in place by a nut 250. The work-holding stud 246 is tapered adjacent its threaded end 244 to engage the flared portion 243. The workpiece W is urged upwardly into engagement with the grinding wheel 42 by the leaf spring 138 acting against the push rod 158 to urge the carriage 148 and the mechanism mounted thereon upward. The carriage 148, however, is optionally locked in a rigid position, when desired, for certain kinds of special operations, by a vertical stud 252, the lower end of which is threaded into a bore 254 in the base 32 (Figure 1) and the upper end of which passes through an enlarged hole 256 in the forward end of the carriage 148 and carries lock nuts 258 and 260 respectively above and below the carriage 148 to lock the latter rigidly in position when so desired. The stud 252 and its lock nuts 260 and 258 are normally removed from the apparatus and hence are shown in dotted lines in Figure 1 as only optionally or occasionally used.

The rearward end of the inner tubular shaft 224, like the forward end thereof, is threaded internally as at 262 and also flared as at 264 to receive the threaded inner end 266 of a pattern-holding stud 270 similar to the stud 246 and similarly tapered as at 272 to engage the flared portion 264. The pattern-holding stud 270 has a reduced diameter partially threaded portion 274 (Figure 7) which receives a similarly-bored pattern 275 held in place by a nut 276. The pattern 275, like the workpiece W, is urged upwardly along with the carriage 148 and the mechanism carried thereby, by the leaf spring 138 engaging the push rod 158, and engages the follower roller 94, which, as has been previously stated, has been machined to substantially exactly the same diameter as the grinding wheel 42 and maintained at the same diameter by the simultaneous truing operation shown in Figure 8.

A driving connection is established between the outer and inner tubular shafts 208 and 224 by way of the housing 232 and indexing device 234 in the following manner. The housing 232, which as stated above, is threaded as at 230 upon the threaded rearward end 228 of the outer tubular shaft 208, is provided at its upper end with aligned bores 278 and 280 (Figure 6) in which is journaled a worm shaft 282, the outer forward end of which is provided with an enlargement 284 and a partially-threaded portion 286 upon which is mounted an indexing arm or handle 288 held firmly in place by the nut 290 threaded thereon and slotted radially as at 292 for radial adjustment, as described below.

The outer end of the indexing arm or handle 288 is provided with a tubular portion 294 having a bore 295 parallel to the axis of the worm shaft 278 and slidably receiving the enlarged head 296 of a reciprocable plunger 298, the forward end of which passes through an annular plug 300 closing the forward end of the bore 295 and is threaded as at 302 to receive a knurled thumb nut 304. The plunger 298 is urged inwardly by a helical compression spring 305 disposed within the bore 295. The rearward end of the plunger 296 is provided with a reduced diameter pin-like portion 306 which enters any one of a series of circumferentially-spaced holes 308, 310 or 312 in an indexing disc 314 and disposed concentric with the axis of rotation of the worm shaft 278. By loosening the nut 290, withdrawing the pin portion 306 from any one of these holes by pulling upon the knob 304, the indexing arm 288 may be shifted radially so as to cause the pin portion 306 to engage another circular row of the holes 308, 310 or 312, as desired. After such alignment is made, the nut 290 is tightened to lock it in its adjusted position. The indexing disc 314 is pinned as at 316 to the housing 232 and centrally bored as at 318 to be received upon the correspondingly turned portion 320 thereof (Figure 6) which also receives pointers 321 and 322 (Figure 12) held in position by a snap ring 324 snapped into a groove 326 in the portion 320.

Pinned or otherwise drivingly secured to the worm shaft 278 is a worm 328 (Figures 6 and 7) which meshes with a worm ring gear 330 having a centrally-ridged internal cylindrical surface 332 held between a disc 334 (Figure 7) and a flanged collar 336 by screws 338, the collar 336 being drivingly secured to the inner tubular shaft 224 by a set screw 340 entering an indentation 342 therein.

The carriage 148 is shifted axially to and fro along the pivot shaft 142 by the below-described cam mechanism engageable with a stationary cam or pattern follower 344 rotatably mounted upon a headed axle bolt 346 (Figures 1 and 4) which in turn is mounted in an inclined bore 348 in the upwardly-inclined end portion 350 of an offset arm or outrigger 352 extending horizontally from the top of the rotatable support 120 (Figure 4) parallel to the axis of the pivot shaft 142. This cam mechanism is driven from the sprocket 210 (Figures 4 and 7) by a sprocket chain 354 meshing therewith and with a sprocket 356 (Figures 1 and 4) which is keyed as at 358 to a countershaft 360 (Figure 4) journaled in aligned bores 362 in spaced journal bracket 364 (Figures 1 and 4) which rise from and are integral with the carriage 148. The outer end portion 366 of the countershaft 360 is of reduced diameter to enter the corresponding bore 368 in a crown cam 370, a separable driving connection therebetween being provided by a set screw 372 (Figure 1) threaded into or out of a radial bore 374 in the crown cam 370 so that its inner end is drivingly engaged with or disengaged from a recess 376 in the reduced diameter portion 366 of the countershaft 360. The outer end of the reduced diameter portion 366 is threaded to receive a retaining nut 378 by which the cam 370 is held upon the countershaft 360. The crown cam 370 is provided with a cam surface or edge 380 of undulating configuration (Figure 4) engageable with the cam follower roller 344. As a consequence, when the crown cam 370 is rotated by its driving connection through the sprocket chain 354 with the tubular shaft 208, the thrust of the undulating surface 380 against the stationary roller 344 on the arm 352 pushes the carriage 348 back and forth along the pivot shaft 142 (Figure 4), the motion in one direction being effected by the helical compression spring 144 encircling the shaft 142.

The gear housing 192 enclosing the worm drive gearing 202, 204 for the tubular shaft 208 is ring-shaped and made in halves bolted together as at 382 (Figure 7), the housing 192 being itself bolted as at 384 to the carriage 148 and also recessed as at 386 to permit vertical adjustment of the push rod 158. The ends of the chamber 200 in the housing 192 are closed by flanged end plates or discs 388 bored at 390 to receive the inwardly-projecting ends of the bearing brackets 216 and 218 (Figure 7). The motor 162 is supplied with current from any suitable source of electricity.

In the operation of the apparatus 30, as set up for the external grinding of workpieces without axial motion of the workpiece and grinding wheel erlatively to one another (Figures 1 to 7 inclusive), the workpiece W and corresponding pattern 275 are mounted in the manner shown in Figure 7 and previously described above, and it is assumed that the portion 94 of the pattern follower roller 92 has been trued to the same diameter as the grinding wheel 42, as shown in Figure 8. The indexing mechanism 234 is not used at this time, and merely transmits motion between the outer and inner tubular shatfs 208 and 224 while rotating as a unit with the outer tubular shaft 208. Moreover, the set screw 372 is retracted in the radial bore 374 (Figure 1) to disengage it from the recess 376 in the countershaft 366, so as to disconnect the crown cam 370 from its driving connection with the countershaft 366 and thus prevent axial motion of the carriage 148 to and fro along its pivot shaft 142 while grinding is taking place.

Electric current is supplied to the vertical motor 162, causing energization of the vertical motor 162 and consequent rotation of its armature shaft 164. The latter drives the pulled shaft 176 and pulley 180 through the gearing 172, 174, rotating the pulley 184 and shaft 186 by means of the quarterturn belt 182. The rotation of the shaft 186 and its worm 202 (Figure 5) consequently rotates the worm wheel 204 at a greatly reduced speed and thereby rotates the outer tubular shaft 208 and the inner tubular shaft 224 at the same speed, through their driving connection by way of the indexing device worm gearing 328, 330 and the set screw 340 (Figure 7). As the inner tubular shaft 224 rotates, the periphery of the pattern 275 is constantly urged against the stationary cam roller or pattern follower 92, 94 by means of the engagement of the leaf spring 138 with the push rod 158, forcing the carriage 148 resiliently upward around its pivot shaft 142.

The carriage 148 rises and falls in accordance with the contour of the periphery of the pattern 275, causing the workpiece W to rise and fall as it is rotated by the same tubular shaft 224. As a result, the periphery of the workpiece W acquires the same configuration or profile as the periphery of the pattern 275, notwithstanding the presence of irregular lobes thereon, because the grinding wheel 42 and pattern follower roller portion 94 are of the same diameter.

For manual rotation of the shaft 224, while it is indexed accurately, the indexing device 234 comes into use without operation of the motor 162. The operator selects the circular row of holes 308, 310 or 312 in the indexing disc 314 corresponding to the angle through which he wishes to rotate the shaft 224 at each indexing step, and rotates the shaft 224 step-by-step while the workpiece W is acted upon by a machining tool such as a cutter or grinder mouned on the shaft 40. In this manner, a number of machined portions may be produced on the workpiece W at locations spaced at predetermined angles around the periphery.

The height of the carriage 148 above the base 32 may be adjusted by means of the eccentric disc 106 (Figure 2) and eccentric bore 116 containing the shank 118 of the rotatable support 120, rotating the entire assembly to the desired offset while the hand wheel 124 is in its tightened clamping position, so as to rotate the disc 106 within the stepped bore 104, the clamping ring 112 being loosened, if necessary, by applying a spanner or wrench to its peripheral recess 114. When the disc 106 has been rotated to the desired amount, the ring 112 is retightened, the hand wheel 124 loosened, and the rotary support 120 swung back into a vertical position, at its new height above the base 32, whereupon the hand wheel 124 is retightened to clamp the assembly in a new position.

In the event that it is desired to clamp the carriage 148 in a nontilting position for producing types of workpieces outside the scope of the present invention, but widening the usefulness of the apparatus, especially in a small shop, the vertical stud 252 (Figure 1) is threaded into the threaded bore 254 in the base 32 with its upper end portion extending through the hole 256 in the carriage 148. The nut 260 is adjusted upward or downward until the carriage 148 is at the correct height, whereupon the nut 258 is tightened to hold the carriage in that position. Under these circumstances, of course, the pattern 275 is not used, because the carriage 148 cannot rise and fall at this time around its pivot shaft 142.

*Helical grinding set-up of the apparatus*

The helical grinding set-up of the apparatus 400 (Figures 9 to 11 inclusive) employs the same apparatus 30 as in Figures 1 to 7 inclusive, with a few minor substitutions. Accordingly, similar elements are designated with the same reference numerals, and a repetition of the description is therefore unnecessary. To convert the apparatus 30 of Figures 1 to 7 inclusive into the set-up 400 of Figure 9, the housing 232 and its indexing mechanism 234 are removed, together with the inner tubular shaft 222 and the parts carried thereby, including the work-holding stud 246 and the pattern holding stud 270, the housing 232 being unscrewed from the threaded portion 228 of the outer tubular shaft 208. At the same time, the headed axle bolt 88 and roller 92 are removed and replaced by an elongated headed axle bolt 402 and an elongated pattern follower roller 404 (Figure 9). The pattern stud 270 is replaced by a pattern unit 405 including an elongated stud 406 having its threaded end 408 and flared portion 410 engaging the correspondingly threaded and flared portions 407 and 409 of an auxiliary inner tubular shaft 411. The stud 406 of the pattern unit 405 also has a helical groove 412 therein and also has a neck 414 upon the end of which is mounted a back-off pattern 416 with lobes or high points 417 corresponding to the cutting edges of the cutting teeth T, backing off to low points 419 corrseponding to the trailing edges of the teeth T. The helical groove 412 is engaged by the point 418 of a knurled-headed tracer screw 420 which is threaded through the threaded bore 422 in the outer end of an angle arm 424, the inner end of which is secured to the bearing bracket 216 by a cap screw 426 threaded into the previously unused hole 219. The tracer screw 420 is locked in position by a lock nut 428 threaded thereon.

The auxiliary tubular inner shaft 411 replaces the inner shaft 224 which, as stated above has been temporarily removed, the new shaft 411 having a central keyway 430 which receives a key 432 also engaging the keyway 227 hitherto unused, to establish a driving connection between the outer tubular shaft 208 and the auxiliary inner tubular shaft 411 (Figure 9). The forward end of the auxiliary tubular inner shaft 411 is provided with a threaded portion 434 and an abutment flange 436 for receiving and engaging a suitable work-holding chuck 438. The chuck 438 may be of any suitable type, such as a jaw chuck or collet chuck, depending upon the nature of the workpiece, a jaw chuck being shown for purposes of illustration. The jaw chuck 438, being conventional, is merely shown diagrammatically as consisting of a cylindrical body 440 having a central threaded hole 442 therein for receiving the threaded portion 434 of the inner tubular shaft 411 and having radially reciprocable jaws 444 which are moved radially to and fro by headless adjusting screws 446 which are shifted to and fro by the usual T-wrench. The inner tubular shaft 411 is provided with a bore 448 for receiving the shank S of a workpiece V, a threading tap with cutting teeth T separated by grooves G being shown for purposes of illustration.

The workpiece V is engaged by a sharp-edged bevel grinding wheel 450 which replaces the flat-rimmed grinding wheel 42 previously used. The grinding wheel 450 is beveled to the same configuration as the thread grooves G between the cutting or threading teeth T. The grinding wheel 450 is mounted upon the reduced diameter partially threaded portion 452 of a shaft 454 similar to the shaft 40 and fitting the same bearing bore 38 in the head 36 of the machine tool 34 and held in position by a retaining nut 456.

In the operation of the helical grinding set-up 400 of the apparatus 30 (Figures 9 to 11 inclusive), the pattern 416 is chosen with its periphery of the proper configuration for backing off the cutting teeth T of the workpiece V (Figure 11) while the latter is moved axially by the axial motion of the inner tubular auxiliary shaft 411 by the engagement of the pointed end 418 of the tracer screw 420 with the helical groove 412. Since the tracer screw 420 is held stationary in its angle bracket 424, the rotation of the inner tubular auxiliary shaft 411 also causes it to move axially, as regulated by the helical groove 412, while the carriage 148 rises and falls in accordance with the peripheral configuration of the back-off pattern 416 of the pattern unit 405. As a consequence, the grinding wheel 450 grinds the flanks of the teeth T by grinding the grooves G therebtween in a helical path, with back-off of each tooth provided by the lobes of the back-off pattern 416 through the thereby-regulated rise and fall of the carriage 148 and shaft 411 rotatably supported thereby. As a result, the teeth T acquire the backed-off configuration shown in Figure 11, with a forward cutting edge and a rearward trailing edge located radially inward on a smaller diameter than the forward cutting edge, finishing the threading tap V in this manner.

*Internal grinding set-up of the apparatus*

The internal grinding set-up, generally designated 460, shown in Figures 12 to 16 inclusive, also utilizes the apparatus 30 of Figures 1 to 7 inclusive, with a few minor substitutions, hence similar reference numerals are applied to corresponding parts and a repetition of the description is therefore unnecessary. In the set-up 460, however, the work-holding and pattern studs 246 and 270 together with the workpiece W and pattern 275 are removed from the inner tubular shaft 224. An internal pattern unit, generally designated 462, is substituted for the patterns used in the other set-ups previously described, and has a similar threaded shank 464 and tapered portion 466 engaging the internally-threaded portion 262 and flared portion 264 respectively of the inner tubular shaft 224. The outer end portion of the pattern unit 462, however, consists of a pattern head 468 integral with the shank 470 thereof and provided with an internal cam or pattern surface 472 of a configuration corresponding to the configuration to be internally ground on the workpiece R. For purposes of illustration, the internal pattern or cam surface 472 (Figure 14) is shown to be of approximately triangular shape with rounded corners 474, two straight sides 476 and an arcuate side 478 corresponding respectively to the approximately triangular internal workpiece portion 480 (Figure 13) having straight radial sides 482 and an arcuate outer side 484 separated from one another by rounded corners 486. The workpiece R is provided with circumferentially-spaced holes 487 into which the grinding wheel may be inserted, as a starting point for each portion 480.

The internal pattern or cam surface 472 engages a cam follower roller 488 similar to the roller 92 and similarly mounted upon a headed axle bolt 83 on the vertical arm 74, as described in connection with Figure 7. The internal surface 480 to be ground on the workpiece R is engaged by a grinding wheel 490 which is mounted on the end portion 492 of a shank 494 (Figure 12) which is held in a chuck 496 rotatably mounted and power-driven in a vertically reciprocable head 498 mounted in a guideway 500 and moved up and down by a screw shaft 502 secured as at 504 to the head 498 and moved to and fro by a hand wheel 506 threaded on the screw shaft 502. The extent of motion of the hand wheel 506 and therefore the screw shaft 502 and head 498 is indicated on a suitably-graduated circular scale 508 mounted on the guideway 500 and aligned with an index mark 510 on the hand wheel 506.

Threaded onto the hitherto unused external threaded portion 240 of the inner tubular shaft 224 is a work holding and indexing unit, generally designated 512, and having a face plate 514 with a hub 516, the latter having an internally-threaded portion 518 engaging the threaded portion 240 (Figure 12). The face plate 514 is rectangular in form with a central groove or guideway 520 and parallel elongated slots 522 at top and bottom. Cap screws 524 pass through the slots 522, which are parallel to the guideway 520, and are threaded into threaded ho es 526 in the back member 528 of a box-like housing 530 having side walls 532 secured thereto and integral therewith. The housing 530 is also provided with a stepped circular opening 536 in which is mounted a similarly-stepped turntable 538. The turntable 538 has a rearwardly-disposed worm gear 540 integral therewith and rearwardly of the latter three successively reduced diameter stepped portions 542, 544 and 546 respectively, the portion 544 being mounted in a circular bore 548 and the portion 546 is threaded to receive a retaining nut 550 (Figure 12). The turntable 538 is provided with a central axial threaded bore 552 which receives a work clamping bolt 554, the turntable 538 having a forwardly-projecting portion 556 upon which the workpiece R is mounted.

Meshing with the worm gear 540 is a worm 558 (Figure 13) pinned or otherwise drivingly secured to a worm shaft 560 journaled at its opposite ends in bores 562 and 564 in the housing 530 and held in place by a nut 566 on its lower end. A stationary drum 568 is mounted on the upper end of the housing 530 above the bore 564 and has a bore 570 aligned therewith. Passing through the bores 564 and 570 is the enlarged head 572 of the worm shaft 560, which terminates in a graduated rotary drum 574 carrying a handle or knob 576. The graduations of the drum 574 register with an index mark 578 on the stationary drum 568.

For optional use in place of the internal pattern unit 462 (Figures 12 and 14), an external pattern unit 580 (Figure 16) may be used to produce the internally-ground surface 581 of the workpiece B of Figure 15. The pattern unit 580 is of the same construction as the pattern 275 (Figure 7) but of different peripheral outline, and is mounted on the same pattern stud 270 and held in place by the same nut 276 previously described in connection with Figure 7. The workpiece B of Figure 15 is generally similar to the workpiece R of Figure 13, hence requires no further description. The periphery 582 of the pattern 580 may be geometrically described as the locus or path upon which the grinding wheel 490 rolls while its periphery is engaging the internal surface 581. In other words, it is of similar shape but reduced in size on each side by an amount equal to the diameter of the grinding wheel 490. The periphery 582 of the pattern 580 is engaged by the pattern follower rol er 488 of Figure 12 in the same manner as the internal surface 472 of the pattern portion 468.

In the operation of the internal grinding set-up 460 of the apparatus 30 (Figures 12 to 15 inclusive), the workpiece R is mounted on the bolt 554 and clamped thereby to the forwardly projecting portion 556 of the turntable 538. The grinding wheel head 498 is adjusted up and down by the hand wheel 506 until it is in the proper position. Assuming that the internal cam unit 462 is being used, the rotation of the inner tubular shaft 224 and the work holding and indexing unit 512 threaded thereon causes the grinding wheel 490, which has been inserted in the hole 487 at the location to be occupied by the ground workpiece portion 480, to grind away the edges of the hole 487 and convert it from its original circular shape to its round cornered approximately triangular s ape 480. The configuration of the internal surface 472 of the internal pattern unit 462, in engagement with the stationary follower roller 488, determines the outline of the workpiece portion 480 in accordance with the rise and fall of the carriage 148 brought about thereby. A similar configuration of the workpiece is obtained by using the external pattern 580 with its periphery 582 (Figure 16) engaging the follower roller 488, producing the same rise and fall of the carriage 148.

When one of the portions 480 has been produced, the workpiece R is rotated by rotating the drum 574 a predetermined amount shown by its graduations with reference to the index point 578, so as to bring the next hole 487 into line with the grinding wheel 490 which, of course, is temporarily withdrawn after each portion 480 has been completed. In this manner, the turntable 538 and the workpiece R thereon is indexed to its new location for producing each of the circumferentially-spaced portions 480 in the manner described above.

Backing-off set-up of the apparatus

Figures 17 to 22 inclusive show the set-up, generally designated 600, of the apparatus 30 of Figures 1 to 7 inclusive, for producing workpieces which require backing-off during the grinding or other machining operation, such as the end mill 602 shown in Figure 23 and having a head 604 with a shank 606 and forwardly-projecting cutting lips 608 of arcuate form longitudinally and angled arrangement laterally so as to provide an arcuate leading or cutting edge 610 and an arcuate trailing edge 612 located closer to the axis of rotation so as to provide a clearance for chips and a more efficient cutting action. The cutting lips 608 are separated from one another by concave flutes or recesses 614.

The apparatus set-up 600 is identical with that of the apparatus 30 except that a pattern 616 of different outline is of course used, corresponding to the different outline of the workpiece 602. In view of the different nature of the workpiece 602 as being provided with a shank 606, a chuck, generally designated 618, of conventional form is used, and threaded into the internally-threaded bore 242 of the inner tubular shaft 224 in place of the work holding stud 246. The shank 606 of the workpiece 602 is in turn clamped into the socket or jaw opening 620 of the chuck 618. In the set-up 600, however, the crown cam 370, instead of being drivingly disconnected from the shaft 366 so as to be motionless, is now drivingly connected thereto by screwing the set screw 372 radially into the threaded bore 374 (Figure 1) until it drivingly engages the recess 376 in the shaft 366. As a consequence, when the inner tubular shaft 224 is rotated, the crown cam 370 is rotated at the same speed by its driving connection through the countershaft 366, the equally-toothed sprockets 210 and 356, and the sprocket chain 354. As a result of the action of the crown cam 370, the carriage 148 reciprocates to and fro along its pivot shaft 142 as it is tilted up and down in response to the configuration of the periphery 622 of the pattern 616, resulting in a backing-off of the workpiece 602 in an axial direction as it is moved toward and away from the grinding wheel 624 in response to the change in the peripheral configuration of the pattern 616.

The grinding wheel 624 is, of course, of a configuration corresponding to the configuration of the portions 608 to be ground on the workpiece 602 but is mounted on the portion 45 of the shaft 40 of the machine tool 34 in a similar manner to that of the grinding wheel 42 in Figure 7, and similarly secured in position by a nut 46 threaded upon the reduced diameter portion 48 of the shaft 40 (Figure 17). In view of the inclination of the cutting lips 608 to the axis of rotation of the workpiece 602, however, the axis of rotation of the shaft 40 is tilted relatively to the axis of rotation of the inner tubular shaft 224, as shown in Figure 17. Figures 24 and 25 illustrate the defective workpiece which results in the absence of the backing-off provided by the crown cam 370, as discussed below in connection with the operation.

In the operation of the axially-reciprocatory set-up 600 of Figures 17 to 22 inclusive, the pattern 616 is chosen with the desired profile of its periphery 622 to produce the proper lateral backing off between the forward or cutting edge 610 and the rearward or trailing edge 612 of each lip 608 (Figure 23), and the grinding wheel 624 is trued to an arcuate cross section corresponding to the arcuate profile of each lip 608 to be ground. The grinding wheel 624 is mounted on the shaft 40 and the latter set with its axis at the necessary angle to the axis of rotation of the inner tubular shaft or work holding shaft 224 to produce the proper inclination of the lips 608. The set screw 372 in the radial bore 374 of the crown cam 370 is now screwed inward until its inner end is seated in the recess 376 in the countershaft 366, establishing a driving connection therebetween.

With the workpiece blank mounted in the chuck 618, the rotation of the inner tubular shaft 224 by the motor 162 causes the carriage 148 to rise and fall around its pivot shaft 142, in accordance with the configuration of the periphery 622 of the pattern 616. At the same time, the rotation of the crown cam 370 and the consequent thrust of its undulating periphery 380 against the stationary follower roller 344 causes the carriage 148 to shift axially to and fro along the pivot shaft 142, the carriage being returned by the thrust of the compression spring 120 (Figure 4) against the support 120 (Figure 4). In response to this motion, the workpiece 602 is moved axially to and fro as it is moved up and down by the tilting of the carriage 148. In consequence, each lip or land 608 is ground with its proper arcuate configuration and back-off between its forward and rearward edges 610 and 612.

If the crown cam 370 or its equivalent is not used, and the carriage 148 is not reciprocated along its pivot shaft 142, the workpiece 630 is ground with defective lands with the opposite edges 632 and 634 of its lands or lips 636 converging toward one another so that the lands or lips 636 have pointed outer ends and consequently the lands or lips 636 are structurally weak at their outer ends 638, where the greatest stress arises during the cutting operation when the tool is put into use. The proper reciprocation of the workpiece by the crown cam 370 or its equivalent avoids this defect and produces lands or lips 608 of substantially constant width up to the periphery of the head 604 (Figure 23).

What I claim is:

1. A quickly-convertible apparatus for machining external and internal surfaces of irregular outline upon a workpiece guidedly moved against a rotary machining tool, said apparatus comprising a base, a pivot element mounted on said base, a rocking carriage tiltably mounted on said pivot element, an outer tubular shaft rotatably mounted on said carriage upon an axis spaced away from and parallel to the pivot axis of said pivot element, an inner shaft removably mounted within said outer shaft upon an axis coaxial therewith for rotation relatively thereto, a worm gear drivingly connected to said inner shaft for rotation unitarily therewith, a worm mount drivingly connected to said outer shaft for rotation unitarily therewith, a worm rotatably mounted in said worm mount in mesh with said worm gear, means for rotating said worm whereby to adjustably rotate said inner shaft relatively to said outer shaft while simultaneously maintaining a driving connection therebetween, a pattern follower support mounted on said base and extending into proximity to said shafts, a rotary pattern follower mounted on said pattern follower support, a pattern mounted on one of said shafts and engageable with said pattern follower, a workpiece holder mounted on the same shaft as said pattern in proximity to said rotary machining tool, and power-operated shaft-rotating mechanism operatively connected to the other of said shafts.

2. An irregular-outline surface-machining apparatus, according to claim 1, wherein said worm mount comprises a hollow housing encircling said worm gear and drivingly connected to said outer shaft for rotation therewith, wherein said worm is rotatably mounted in said hollow housing in mesh with said worm gear, and wherein a worm-rotating member is rotatingly connected to said worm.

3. An irregular-outline surface-machining apparatus, according to claim 2, wherein said worm-rotating means includes an indexing arm drivingly mounted on said worm-rotating member transversely to the axis of rotation of said worm, an indexing plate mounted on said housing adjacent said arm and having multiple indexing holes therein disposed in an arcuate path concentric with the axis of rotation of said worm, and a locking pin movably mounted on said arm for motion selectively into and out of locking engagement with said indexing holes.

References Cited in the file of this patent
UNITED STATES PATENTS

| | | |
|---|---|---|
| 286,663 | Wheeler | Oct. 16, 1883 |
| 656,685 | Wilhelm | Aug. 28, 1900 |
| 1,085,381 | Di Gianni | Jan. 27, 1914 |
| 1,231,920 | Lumsden | July 3, 1917 |
| 1,884,293 | Schurr | Oct. 25, 1932 |
| 1,974,365 | Oliver | Sept. 18, 1934 |
| 2,406,134 | Cameron | Aug. 20, 1946 |
| 2,421,548 | Davies | June 3, 1947 |
| 2,445,971 | Rosen | July 27, 1948 |
| 2,528,753 | Jessup | Nov. 7, 1950 |
| 2,674,068 | Eves et al. | Apr. 6, 1954 |
| 2,764,855 | Dawson | Oct. 2, 1956 |

FOREIGN PATENTS

| | | |
|---|---|---|
| 582 | Great Britain | Feb. 25, 1869 |